(12) United States Patent
Albertus et al.

(10) Patent No.: US 9,972,854 B2
(45) Date of Patent: May 15, 2018

(54) METAL/OXYGEN BATTERY WITH AN OXYGEN SUPPLY SYSTEM

(71) Applicant: Robert Bosch GmbH, Stuttgart (DE)

(72) Inventors: Paul Albertus, Mountain View, CA (US); John F. Christensen, Mountain View, CA (US); Boris Kozinsky, Waban, MA (US)

(73) Assignee: Robert Bosch GmbH, Stuttgart (DE)

( * ) Notice: Subject to any disclaimer, the term of this patent is extended or adjusted under 35 U.S.C. 154(b) by 1088 days.

(21) Appl. No.: 13/951,716

(22) Filed: Jul. 26, 2013

(65) Prior Publication Data

US 2014/0272611 A1  Sep. 18, 2014

Related U.S. Application Data

(60) Provisional application No. 61/676,625, filed on Jul. 27, 2012.

(51) Int. Cl.
| | |
|---|---|
| *H01M 12/08* | (2006.01) |
| *H01M 8/04* | (2016.01) |
| *H01M 8/04082* | (2016.01) |
| *H01M 8/04089* | (2016.01) |
| *H01M 8/0438* | (2016.01) |
| *H01M 8/04746* | (2016.01) |

(52) U.S. Cl.
CPC ... *H01M 8/04201* (2013.01); *H01M 8/04089* (2013.01); *H01M 12/08* (2013.01); *H01M 8/04395* (2013.01); *H01M 8/04753* (2013.01); *Y02E 60/128* (2013.01)

(58) Field of Classification Search
CPC ..................................................... H01M 12/08
See application file for complete search history.

(56) References Cited

U.S. PATENT DOCUMENTS

| | | |
|---|---|---|
| 5,560,990 A | 10/1996 | Ilg et al. |
| 2011/0143226 A1 | 6/2011 | Pulskamp et al. |
| 2011/0200850 A1 | 8/2011 | Gottwick et al. |
| 2012/0040253 A1 | 2/2012 | Hermann |

(Continued)

OTHER PUBLICATIONS

Abraham et al., "A polymer electrolyte-based rechargeable lithium/oxygen battery", Journal of the Electrochemical Society; 1996; pp. 1-5; vol. 143, No. 1; Norwood, USA (5 pages).

(Continued)

*Primary Examiner* — Sarah A. Slifka
*Assistant Examiner* — Brian R Ohara
(74) *Attorney, Agent, or Firm* — Maginot Moore & Beck LLP

(57) ABSTRACT

In one embodiment, a metal/oxygen battery with an oxygen management system includes a negative electrode, a positive electrode, a separator positioned between the negative electrode and the positive electrode, a first oxygenated gas supply reservoir, a compressor with an outlet fluidly coupled to the first oxygenated gas supply reservoir, and a valve and pressure regulator fluidly coupled to the first oxygenated gas supply reservoir and to the positive electrode and configured to place the first oxygenated gas supply reservoir in fluid communication with the positive electrode during a discharge cycle, and place the positive electrode in fluid communication with an inlet of the compressor during a charge cycle.

11 Claims, 4 Drawing Sheets

(56) References Cited

U.S. PATENT DOCUMENTS

2012/0041628 A1    2/2012    Hermann et al.
2012/0148928 A1*  6/2012    Mitsui et al. ............... 429/414

OTHER PUBLICATIONS

Amatucci et al., "Flouride based electrode materials for advanced energy storage devices," Journal of Flourine Chemistry; 2007; pp. 243-262; vol. 128, No. 4; Elsevier; North Brunswick, USA (20 pages).

Beattie et al., "High-Capacity Lithium-Air Cathodes", Journal of the Electrochemical Society; 2008; vol. 156; Canada (13 pages).

Christensen et al., "Effect of Anode Film Resistance on the Charge/Discharge Capacity of a Lithium-Ion Battery", Journal of the Electrochemical Society; 2003; pp. A1416-A1420; vol. 150, No. 11; Berkeley, USA (5 pages).

Christensen et al., "Cyclable Lithium and Capacity Loss in Li-Ion Cells", Journal of the Electrochemical Society; 2005; pp. A818-A829; vol. 152, No. 4; Berkeley, USA (12 pages).

Kumar et al., "A Solid-State, Rechargeable, Long Cycle Life Lithium-Air Battery", Journal of the Electrochemical Society; 2010; pp. A50-A54; vol. 157, No. 1; Needham, USA (5 pages).

Ogasawara et al., "Rechargeable $Li_2O_2$ Electrode for Lithium Batteries", Journal of the American Chemical Society; 2006; pp. 1390-1393; vol. 128, No. 4; Switzerland (4 pages).

Read, "Characterization of the Lithium/Oxygen Organic Electrolyte Battery," Journal of the Electrochemical Society; 2002; pp. A1190-A1195; vol. 149; Army Research Laboratory, Adelphi, USA (6 pages).

Read et al., "Oxygen Transport Properties of Organic Electrolytes and Performance of Lithium/Oxygen Battery", Journal of the Electrochemical Society; 2003; pp. A1351-A1356; vol. 150, No. 10; Army Research Laboratory, USA (6 pages).

USABC Goals for Advanced Batteries (1 page).

Yang et al., "The effect of oxygen pressures on the electrochemical profile of lithium/oxygen battery", Journal of Solid State Electrochemistry; 2010; vol. 14, pp. 109-114; Springer-Verlag; China (6 pages).

Zheng et al., "Theoretical Energy Density of Li-Air Batteries", Journal of the Electrochemical Society; 2008; pp. A432-A437; vol. 155, No. 6; USA (6 pages).

Zuttel, "Materials for Hydrogen Storage", Materials Today; 2003; pp. 24-33; vol. 6, No. 9; Switzerland (10 pages).

International Search Report and Written Opinion corresponding to PCT Application No. PCT/US2013/052228, dated Oct. 22, 2013 (15 pages).

* cited by examiner

METAL/OXYGEN BATTERY WITH AN OXYGEN SUPPLY SYSTEM

This application claims the benefit of U.S. Provisional Application No. 61/676,625 filed Jul. 27, 2012, the entire contents of which is herein incorporated by reference.

TECHNICAL FIELD

This disclosure relates to batteries and more particularly to metal/oxygen based batteries.

BACKGROUND

Rechargeable lithium-ion batteries are attractive energy storage systems for portable electronics and electric and hybrid-electric vehicles because of their high specific energy compared to other electrochemical energy storage devices. As discussed more fully below, a typical Li-ion cell contains a negative electrode, a positive electrode, and a separator region between the negative and positive electrodes. Both electrodes contain active materials that insert or react with lithium reversibly. In some cases the negative electrode may include lithium metal, which can be electrochemically dissolved and deposited reversibly. The separator contains an electrolyte with a lithium cation, and serves as a physical barrier between the electrodes such that none of the electrodes are electronically connected within the cell.

Typically, during charging, there is generation of electrons at the positive electrode and consumption of an equal amount of electrons at the negative electrode, and these electrons are transferred via an external circuit. In the ideal charging of the cell, these electrons are generated at the positive electrode because there is extraction via oxidation of lithium ions from the active material of the positive electrode, and the electrons are consumed at the negative electrode because there is reduction of lithium ions into the active material of the negative electrode. During discharging, the exact opposite reactions occur.

When high-specific-capacity negative electrodes such as a metal are used in a battery, the maximum benefit of the capacity increase over conventional systems is realized when a high-capacity positive electrode active material is also used. For example, conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g, which is quite low compared to the specific capacity of lithium metal, 3863 mAh/g. The highest theoretical capacity achievable for a lithium-ion positive electrode is 1794 mAh/g (based on the mass of the lithiated material), for $Li_2O$. Other high-capacity materials include $BiF_3$ (303 mAh/g, lithiated), $FeF_3$ (712 mAh/g, lithiated), and others. Unfortunately, all of these materials react with lithium at a lower voltage compared to conventional oxide positive electrodes, hence limiting the theoretical specific energy. Nonetheless, the theoretical specific energies are still very high (>800 Wh/kg, compared to a maximum of ~500 Wh/kg for a cell with lithium negative and conventional oxide positive electrodes, which may enable an electric vehicle to approach a range of 300 miles or more on a single charge.

FIG. 1 depicts a chart 10 showing the range achievable for a vehicle using battery packs of different specific energies versus the weight of the battery pack. In the chart 10, the specific energies are for an entire cell, including cell packaging weight, assuming a 50% weight increase for forming a battery pack from a particular set of cells. The U.S. Department of Energy has established a weight limit of 200 kg for a battery pack that is located within a vehicle. Accordingly, only a battery pack with about 600 Wh/kg or more can achieve a range of 300 miles.

Various lithium-based chemistries have been investigated for use in various applications including in vehicles. FIG. 2 depicts a chart 20 which identifies the specific energy and energy density of various lithium-based chemistries. In the chart 20, only the weight of the active materials, current collectors, binders, separator, and other inert material of the battery cells are included. The packaging weight, such as tabs, the cell can, etc., are not included. As is evident from the chart 20, lithium/oxygen batteries, even allowing for packaging weight, are capable of providing a specific energy >600 Wh/kg and thus have the potential to enable driving ranges of electric vehicles of more than 300 miles without recharging, at a similar cost to typical lithium ion batteries. While lithium/oxygen cells have been demonstrated in controlled laboratory environments, a number of issues remain before full commercial introduction of a lithium/oxygen cell is viable as discussed further below.

A typical lithium/oxygen electrochemical cell 50 is depicted in FIG. 3. The cell 50 includes a negative electrode 52, a positive electrode 54, a porous separator 56, and a current collector 58. The negative electrode 52 is typically metallic lithium. The positive electrode 54 includes electrode particles such as particles 60 possibly coated in a catalyst material (such as Au or Pt) and suspended in a porous, electrically conductive matrix 62. An electrolyte solution 64 containing a salt such as $LiPF_6$ dissolved in an organic solvent such as dimethoxyethane or $CH_3CN$ permeates both the porous separator 56 and the positive electrode 54. The $LiPF_6$ provides the electrolyte with an adequate conductivity which reduces the internal electrical resistance of the cell 50 to allow a high power.

A portion of the positive electrode 54 is enclosed by a barrier 66. The barrier 66 in FIG. 3 is configured to allow oxygen from an external source 68 to enter the positive electrode 54 while filtering undesired components such as contaminant gases and fluids. The wetting properties of the positive electrode 54 prevent the electrolyte 64 from leaking out of the positive electrode 54. Alternatively, the removal of contaminants from an external source of oxygen, and the retention of cell components such as volatile electrolyte, may be carried out separately from the individual cells. Oxygen from the external source 68 enters the positive electrode 54 through the barrier 66 while the cell 50 discharges and oxygen exits the positive electrode 54 through the barrier 66 as the cell 50 is charged. In operation, as the cell 50 discharges, oxygen and lithium ions are believed to combine to form a discharge product $Li_2O_2$ or $Li_2O$ in accordance with the following relationship:

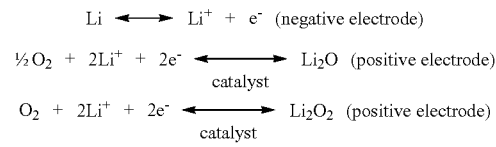

The positive electrode 54 in a typical cell 50 is a lightweight, electrically conductive material which has a porosity of greater than 80% to allow the formation and deposition/storage of $Li_2O_2$ in the cathode volume. The ability to deposit the $Li_2O_2$ directly determines the maximum capacity of the cell. In order to realize a battery system with a specific energy of 600 Wh/kg or greater, a plate with a thickness of 100 μm should have a capacity of about 15 mAh/cm$^2$ or more.

Materials which provide the needed porosity include carbon black, graphite, carbon fibers, carbon nanotubes, and other non-carbon materials. There is evidence that each of these carbon structures undergo an oxidation process during charging of the cell, due at least in part to the harsh environment in the cell (possibly pure oxygen, superoxide and peroxide ions and/or species, formation of solid lithium peroxide on the cathode surface, and electrochemical oxidation potentials of >3V (vs. Li/Li$^+$)).

A number of investigations into the problems associated with Li-oxygen batteries have been conducted as reported, for example, by Beattie, S., D. Manolescu, and S. Blair, "High-Capacity Lithium-Air Cathodes," *Journal of the Electrochemical Society*, 2009. 156: p. A44, Kumar, B., et al., "A Solid-State, Rechargeable, Long Cycle Life Lithium-Air Battery," *Journal of the Electrochemical Society*, 2010. 157: p. A50, Read, J., "Characterization of the lithium/oxygen organic electrolyte battery," *Journal of the Electrochemical Society*, 2002. 149: p. A1190, Read, J., et al., "Oxygen transport properties of organic electrolytes and performance of lithium/oxygen battery," *Journal of the Electrochemical Society*, 2003. 150: p. A1351, Yang, X and Y. Xia, "The effect of oxygen pressures on the electrochemical profile of lithium/oxygen battery," *Journal of Solid State Electrochemistry*: p. 1-6, and Ogasawara, T., et al., "Rechargeable Li$_2$O$_2$ Electrode for Lithium Batteries," *Journal of the American Chemical Society*, 2006. 128(4): p. 1390-1393.

While some issues have been investigated, several challenges remain to be addressed for lithium/oxygen batteries. These challenges include limiting dendrite formation at the lithium metal surface, protecting the lithium metal (and possibly other materials) from moisture and other potentially harmful components of air (if the oxygen is obtained from the air), designing a system that achieves favorable specific energy and specific power levels, reducing the hysteresis between the charge and discharge voltages (which limits the round-trip energy efficiency), and improving the number of cycles over which the system can be cycled reversibly.

The limit of round trip efficiency occurs due to an apparent voltage hysteresis as depicted in FIG. 4. In FIG. 4, the discharge voltage 70 (approximately 2.5 to 3 V vs. Li/Li$^+$) is much lower than the charge voltage 72 (approximately 4 to 4.5 V vs. Li/Li$^+$). The equilibrium voltage 74 (or open-circuit potential) of the lithium/oxygen system is approximately 3 V. Hence, the voltage hysteresis is not only large, but also very asymmetric.

The large over-potential during charge may be due to a number of causes. For example, reaction between the Li$_2$O$_2$ and the conducting matrix 62 may form an insulating film between the two materials. Additionally, there may be poor contact between the solid discharge products Li$_2$O$_2$ or Li$_2$O and the electronically conducting matrix 62 of the positive electrode 54. Poor contact may result from oxidation of the discharge product directly adjacent to the conducting matrix 62 during charge, leaving a gap between the solid discharge product and the matrix 52.

Another mechanism resulting in poor contact between the solid discharge product and the matrix 62 is complete disconnection. Such complete disconnection may result from fracturing, flaking, or movement of solid discharge product particles due to mechanical stresses that are generated during charge/discharge of the cell. Complete disconnection may contribute to the capacity decay observed for most lithium/oxygen cells. By way of example, FIG. 5 depicts the discharge capacity of a typical Li/oxygen cell over a period of charge/discharge cycles.

Other physical processes which cause voltage drops within an electrochemical cell, and thereby lower energy efficiency and power output, include mass-transfer limitations at high current densities. The transport properties of aqueous electrolytes are typically better than nonaqueous electrolytes, but in each case mass-transport effects can limit the thickness of the various regions within the cell, including the cathode. Reactions among O$_2$ and other metals besides lithium may also be carried out in various media.

While many metal/oxygen electrochemical cells draw oxygen from the surrounding atmosphere, the amount of oxygen in the ambient air may be lower than a concentration of oxygen that provides optimal efficiency during charge and discharge operations in the electrochemical cell. Further, ambient air can carry contaminants, such as CO2 and H2O, that reduce the efficiency of the electrochemical cell and can damage the positive electrode and/or other cell components.

What is needed, therefore, is a metal/oxygen battery that uses oxygen efficiently during charge and discharge cycles while preventing contamination of the positive electrode or other cell components.

SUMMARY

In one embodiment, a metal/oxygen battery with an oxygen management system includes a negative electrode, a positive electrode, a separator positioned between the negative electrode and the positive electrode, a first oxygenated gas supply reservoir, a compressor with an outlet fluidly coupled to the first oxygenated gas supply reservoir, and a valve and pressure regulator fluidly coupled to the first oxygenated gas supply reservoir and to the positive electrode and configured to place the first oxygenated gas supply reservoir in fluid communication with the positive electrode during a discharge cycle, and place the positive electrode in fluid communication with an inlet of the compressor during a charge cycle.

In another embodiment, a metal/oxygen battery with an oxygen management system including a metal/oxygen electrochemical cell with a positive electrode, a valve and pressure regulator including a first port fluidly coupled to the positive electrode and configured to alternatively fluidly couple the first port to a second port and a third port, a high-pressure reservoir in fluid communication with the second port, a compressor including (i) an inlet in fluid communication with the third port, and (ii) an outlet in fluid communication with the high-pressure reservoir.

DETAILED DESCRIPTION

Figure 1:
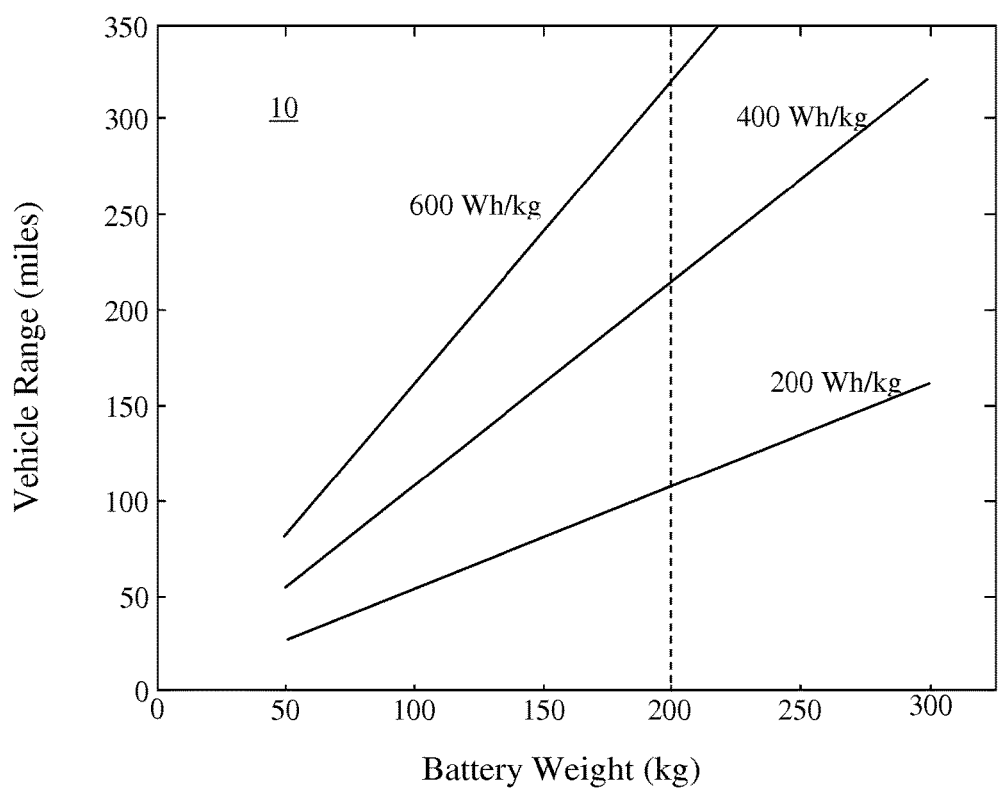
FIG. 1 depicts a plot showing the relationship between battery weight and vehicular range for various specific energies.
Figure 2:
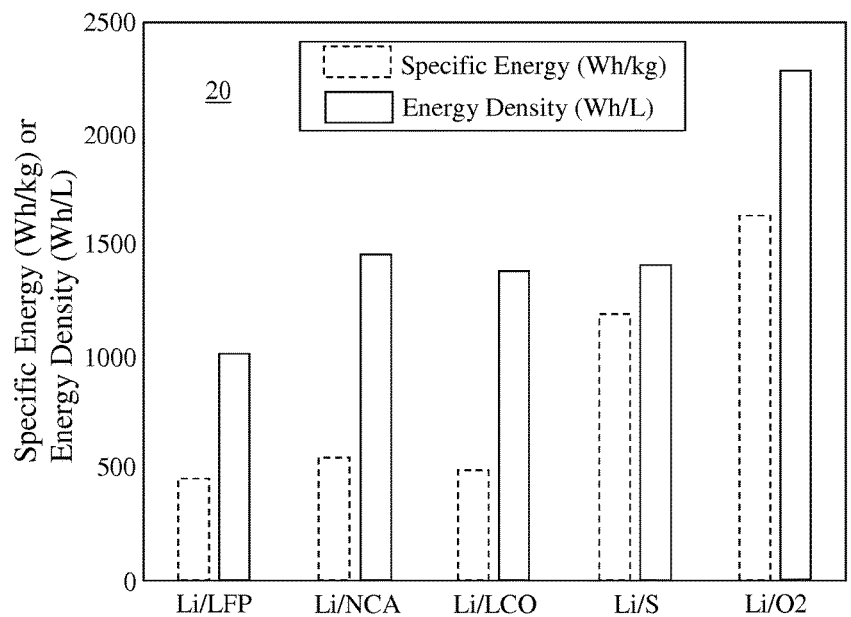
FIG. 2 depicts a chart of the specific energy and energy density of various lithium-based cells.
Figure 3:
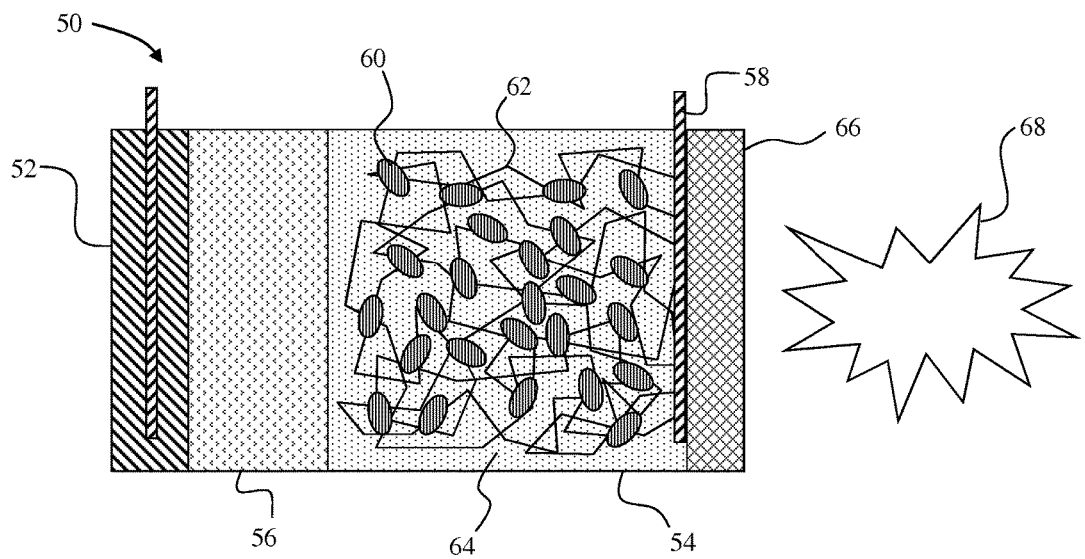
FIG. 3 depicts a prior art lithium/oxygen (Li/oxygen) cell including two electrodes, a separator, and an electrolyte.
Figure 4:
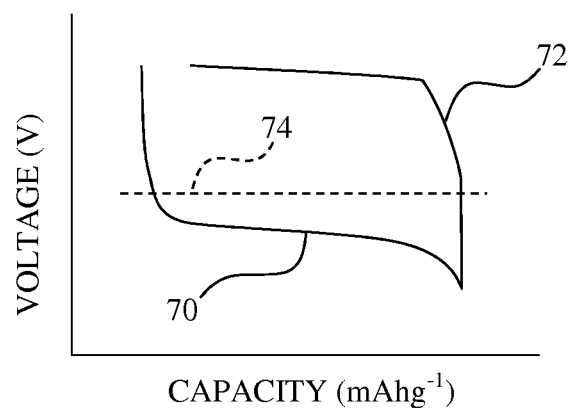
FIG. 4 depicts a discharge and charge curve for a typical Li/oxygen electrochemical cell.
Figure 5:
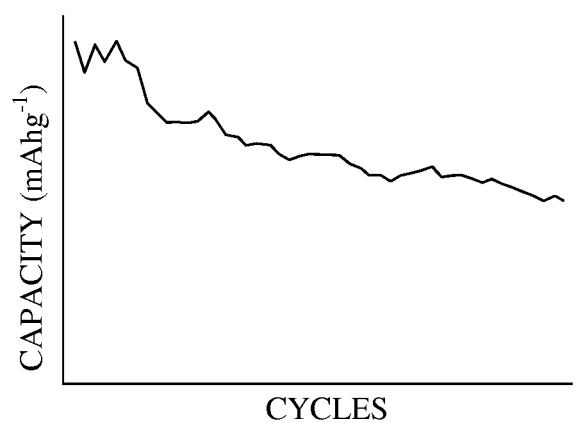
FIG. 5 depicts a plot showing decay of the discharge capacity for a typical Li/oxygen electrochemical cell over a number of cycles.
Figure 6:
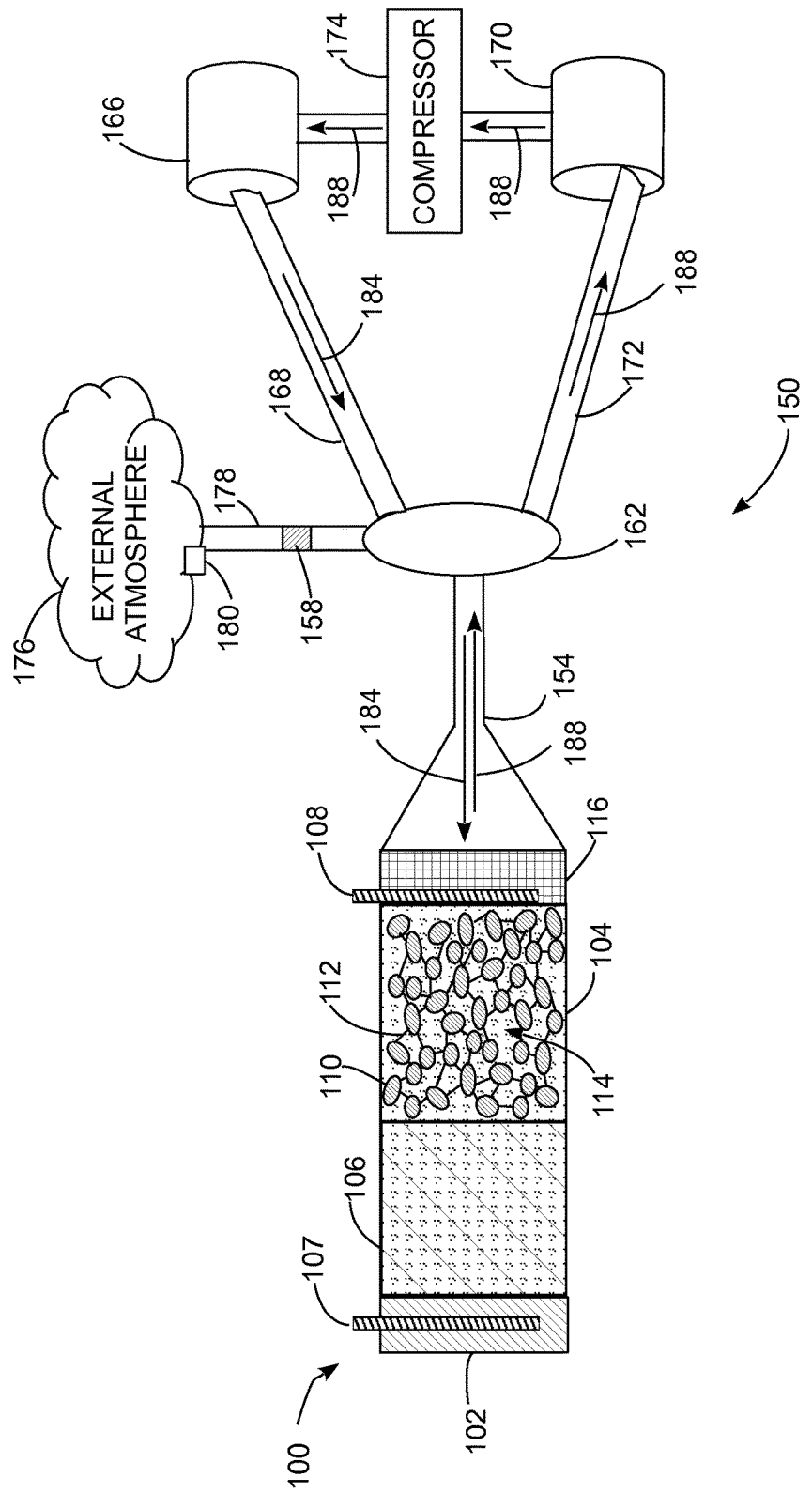
FIG. 6 depicts a schematic view of a lithium/oxygen (Li/oxygen) cell with two electrodes and a pressurized oxygen supply system that is configured to supply oxygen to the cell during a discharge cycle and accept oxygen from the cell during a charge cycle.

A schematic of an electrochemical cell 100 is shown in FIG. 6. The electrochemical cell 100 includes a negative electrode 102 separated from a positive electrode 104 by a porous separator 106. The negative electrode 102 may be formed from lithium metal or a lithium-insertion compound (e.g., graphite, silicon, tin, LiAl, LiMg, $Li_4Ti_5O_{12}$), although Li metal affords the highest specific energy on a cell level compared to other candidate negative electrodes. Other metals may also be used to form the negative electrode, such as Zn, Mg, Na, Fe, Al, Ca, Si, and others. In the example of FIG. 6, a current collector 107 is electrically connected to the metal in the negative electrode 102.

The positive electrode 104 in this embodiment includes a current collector 108 and electrode particles 110 that are suspended in a porous matrix 112. The electrode particles 110 are optionally covered in a catalyst material. The electrode particles 110 may be in the form of a thin, stabilizing coating to limit reaction between any discharge products and the electrode particles 110. The porous matrix 112 is an electrically conductive matrix formed from a conductive material such as conductive carbon or a nickel foam, although various alternative matrix structures and materials may be used. The separator 106 prevents the negative electrode 102 from electrically connecting with the positive electrode 104.

The electrochemical cell 100 includes an electrolyte solution 114 present in the positive electrode 104 and in some embodiments in the separator 106. In the exemplary embodiment of FIG. 6, the electrolyte solution 114 includes a salt, $LiPF_6$ (lithium hexafluorophosphate), dissolved in an organic solvent mixture. The organic solvent mixture may be any desired solvent. In certain embodiments, the solvent may be dimethoxyethane (DME), acetonitrile (MeCN), ethylene carbonate, or diethyl carbonate.

The oxygen atoms and $Li^+$ ions within the positive electrode 104 form a discharge product inside the positive electrode 104, aided by the optional catalyst material on the electrode particles 110. As seen in the following equations, during the discharge process metallic lithium is ionized, combining with oxygen and free electrons to form $Li_2O_2$ or $Li_2O$ discharge product that may coat the surfaces of the carbon particles 110.

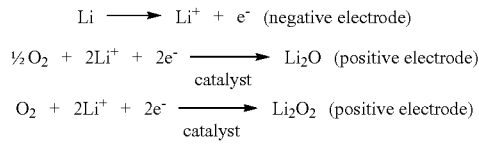

In the example of FIG. 6, the cell 100 is coupled to an oxygen management system 150. The oxygen management system 150 includes an inlet/outlet coupling 154, valve and pressure regulator 162, high-pressure gas supply reservoir 166, low-pressure gas supply reservoir 170, and a compressor 174. The oxygen management system 150 includes an optional air inlet 178 that is coupled to the external atmosphere 176 through a selectively permeable membrane 158.

In some embodiments, the oxygen management system 150 includes a memory (not shown) and processor (not shown) which control, for example, operation of the compressor based upon a sensed condition of the cell 100.

While the oxygen management system 150 is depicted as being coupled to the single cell 100 for illustrative purposes in FIG. 6, the oxygen management system 150 can be coupled to a plurality of cells in one or more battery packs to provide a centralized storage and control system for oxygen in a larger battery system. In an exemplary embodiment, the battery packs including the cell 100 and oxygen management system 150 are incorporated into a motor vehicle. In another non-limiting example, the cell 100 and oxygen management system 150 are electrically connected to an electrical power generator, such as a wind or solar power generator, to store energy for use when the electric power generator is not operating at full capacity.

In some configurations, the oxygen management system 150 handles high concentrations of oxygen, which is to say that the system 150 handles pure oxygen or oxygen at a measurably higher concentration that is typically present in the Earth's atmosphere. In another configuration, the oxygen management system 150 handles compressed air with a composition that is similar to standard air in the atmosphere, but can be filtered to remove moisture ($H_2O$), carbon monoxide (CO), carbon dioxide ($CO_2$), nitrogen oxide ($NO_x$) compounds that are commonly associated with smog, and other contaminants that can negatively impact the operation of the cell 100. In particular, contaminants that react with catalyst materials in the positive electrode 104 to "poison" the catalyst can be filtered at one or more locations in the oxygen handling system 150. Also, some of the common components of air such as $CO_2$ and $H_2O$ react with the discharge product $Li_2O_2$ to form LiOH and/or $Li_2CO_3$, which damages the cell.

During a discharge cycle, the cell 100 admits oxygen to the positive electrode 104. Pressurized oxygenated gas flows from the high-pressure gas supply reservoir 166 through a conduit 168 to the valve and pressure regulator 162 in direction 184. During the discharge cycle, the valve and pressure regulator 162 places the high-pressure gas supply reservoir 166 in fluid communication with the inlet/outlet coupling 154 to enable the gas to flow in direction 184 through the barrier 116 and into the positive electrode 104.

In the example of FIG. 6, the high-pressure gas supply can store the oxygenated gas at a higher pressure than an operating pressure of gas in the cell 100. For example, the high-pressure gas supply can store the oxygenated gas in a range of 20 to 500 bar, while the cell 100 is configured to accept the gas at a pressure of 1 to 10 bar.

Increased pressure of the oxygenated gas can promote efficient operation of the cell 100 up to a certain pressure level. For example, operating the electrochemical cell 100 at a pressure of greater than one bar (atmospheric pressure at sea level) can help prevent delamination of the Li metal electrode from its protection layers. The elevated pressure can also reduce mass-transport limitations in the positive electrode and thereby increase the limiting current by increasing the chemical potential of oxygen. At higher pressures of oxygen, the amount of oxygen dissolved in the electrolyte and the driving force for oxygen transport to the reaction site is increased.

If the pressure is increased to excessive levels, however, then the oxygenated gas can damage the cell 100. Consequently, the valve and pressure regulator 162 regulates the maximum pressure of the oxygenated gas that is supplied to the inlet/outlet coupling 154 to enable the oxygenated gas to flow into the cathode 104 at a predetermined operating pressure level. In the example of FIG. 6, the valve and pressure regulator 162 is configured to enable the oxygenated gas to flow into the cell 100 at a pressure of up to 10 bar.

In an embodiment where the oxygen management system 150 is incorporated with a vehicle, the high-pressure gas supply reservoir 166 should store sufficient oxygen to enable a reasonable driving range when operating in a "closed-loop" mode that does not draw air from the external atmosphere 176. This is particularly relevant given the limited range of hydrogen-powered fuel cells using compressed gas storage. Assuming that both oxygen and hydrogen obeyed the ideal gas law even at high pressure, the number of moles of oxygen that must be stored would be significantly lower than the number of moles of hydrogen to store, for a given amount of energy, because the potential of the lithium/oxygen cell is at least three times higher at working potentials than the hydrogen/oxygen cell. At high pressures, where the compressibility factor rises above 1.0 (indicating deviations from the ideal gas law), oxygen is easier to store than hydrogen because hydrogen has a lower compressibility factor.

For a lithium/oxygen cell with oxygen stored at 500 bar in a 75 L tank, the weight of the oxygen is approximately 40.4 kg and the vehicle range is approximately 421 miles, assuming that the vehicle can travel 3 miles per kWh and a discharge energy efficiency for the lithium/oxygen cell of 0.7. In contrast, a vehicle powered by a hydrogen fuel cell with an energy efficiency of 0.5 and a tank of the same size and pressure of hydrogen would store a mass of approximately 2.1 kg, with a shorter vehicle range of approximately 101 miles. Thus, with a reasonably sized pressurized tank, a very good range can be obtained for compressed oxygen and a lithium/oxygen cell.

During a charge cycle, the positive electrode 104 includes a volume of gas, including oxygen, with additional oxygen being formed in reaction products that adhere to the conductive matrix 112 and particles 110 in the positive electrode 104. For example, it is believed that reaction products that include oxygen such as $Li_2O_2$ and $Li_2O$ can be formed in the electrode 104. During the charging process, electrical current flows through the positive electrode 104 and the reaction products disassociate, with the oxygen returning to a gas phase. The gaseous oxygen builds within the positive electrode 104 until a positive pressure urges the gaseous oxygen into the inlet/outlet coupling 154.

During the charge cycle, the valve and pressure regulator 162 places the inlet/outlet coupling 154 in fluid communication with the low-pressure gas supply reservoir 170, and the oxygen flows in direction 188 through a conduit 172 into the low-pressure gas supply reservoir 170. In the configuration of FIG. 6, a compressor 174 is powered by an external electrical power source, which can also be used to charge the cell 100. The compressor 174 draws the oxygen from the low-pressure gas supply reservoir 170 into the high-pressure gas supply reservoir 166. Thus, the oxygenated gas in the oxygen handling system 150 can circulate in a "closed-loop" configuration during multiple charge-discharge cycles. In one embodiment, the low-pressure gas supply reservoir 170 has a smaller volume than the high-pressure gas supply reservoir 166 because the compressor draws oxygen from the low-pressure supply reservoir 166 during the charge cycle.

In another embodiment, the oxygenated gas from the positive electrode 104 escapes into the atmosphere during the charge cycle. The valve and pressure regulator 162 places the compressor 174 in fluid communication with the external atmosphere 176 through the conduit 178 to supply air for the high-pressure gas supply reservoir 166. A structure 158 such as a semi-permeable membrane, adsorption member, and/or a filter 158 is positioned in the conduit 178 to either filter out or remove contaminants so that the gas in the high-pressure gas supply reservoir 166 is suitable for use in the positive electrode 104 during a subsequent discharge cycle. Air is drawn from the outside atmosphere 176 in an "open-loop" configuration.

In another configuration, the oxygen management system 150 can operate in both open-loop and closed-loop configurations at different times based on the ambient air quality and operational parameters of the cell 100. For example, one or more air sensors 180 can detect the presence of contaminants in the external atmosphere 176. A digital controller or other logic device can control the valve and pressure regulator 162 to operate the oxygen management system 150 in the closed-loop mode in response to detecting harmful contaminants in the external atmosphere 176 (e.g., while driving through an industrial area), or on the moisture content in the air.

While the invention has been illustrated and described in detail in the drawings and foregoing description, the same should be considered as illustrative and not restrictive in character. Only the preferred embodiments have been presented and all changes, modifications and further applications that come within the spirit of the invention are desired to be protected.

The invention claimed is:

1. A metal/oxygen battery with an oxygen management system comprising:
   a negative electrode;
   a positive electrode;
   a separator positioned between the negative electrode and the positive electrode;
   a first oxygenated gas supply reservoir;
   a compressor with an outlet fluidly coupled to the first oxygenated gas supply reservoir;
   a second oxygenated gas supply reservoir fluidly coupled to an inlet of the compressor and the valve and pressure regulator; and
   a valve and pressure regulator fluidly coupled to the first oxygenated gas supply reservoir and to the positive electrode and configured to:
      place the first oxygenated gas supply reservoir in fluid communication with the positive electrode during a discharge cycle; and
      place the positive electrode in fluid communication with the compressor inlet during a charge cycle.

2. The metal/oxygen battery of claim 1, wherein:
   the first oxygenated gas supply reservoir has a first pressure rating;
   the second oxygenated gas supply reservoir has a second pressure rating; and
   the first pressure rating is higher than the second pressure rating.

3. The metal/oxygen battery of claim 1, wherein:
   the first oxygenated gas supply reservoir is configured for a maximum pressure between 20 to 500 bar;
   the positive electrode is configured for a maximum normal operating pressure between 1 and 10 bar; and
   the valve and pressure regulator is configured to maintain the pressure in the positive electrode between 1 and 10 bar.

4. The metal/oxygen battery of claim 1, wherein a maximum volume of the first oxygenated gas supply reservoir is greater than a maximum volume of the second oxygenated gas supply reservoir.

5. The metal/oxygen battery of claim 1, further comprising:
an inlet fluidly coupled to the valve and pressure regulator and fluidly coupled to an external atmosphere wherein the valve and pressure regulator is further configured to place the external atmosphere inlet in fluid communication with the compressor during the charge cycle.

6. The metal/oxygen battery of claim 5 further comprising:
a membrane, filter, and/or adsorption unit located between the external atmosphere inlet and the external atmosphere.

7. A metal/oxygen battery with an oxygen management system comprising:
a metal/oxygen electrochemical cell with a positive electrode;
a valve and pressure regulator including a first port fluidly coupled to the positive electrode and configured to alternatively fluidly couple the first port to a second port and a third port;
a high-pressure reservoir in fluid communication with the second port;
a low-pressure reservoir fluidly coupled to the inlet and the third port; and
a compressor including (i) an inlet in fluid communication with the third port through the low pressure reservoir, and (ii) an outlet in fluid communication with the high-pressure reservoir.

8. The metal/oxygen battery of claim 7, wherein:
the high-pressure reservoir is configured for a maximum pressure between 20 and 500 bar;
the positive electrode is configured for a maximum normal operating pressure between 1 and 10 bar; and
the valve and pressure regulator is configured to maintain the pressure in the positive electrode between 1 and 10 bar.

9. The metal/oxygen battery of claim 7, wherein a maximum volume of the high-pressure reservoir is greater than a maximum volume of the low-pressure reservoir.

10. The metal/oxygen battery of claim 7, the valve and pressure regulator further comprising:
a fourth port fluidly coupled to an external atmosphere wherein the valve and pressure regulator is further configured to place the fourth port in fluid communication with the third port.

11. The metal/oxygen battery of claim 10 further comprising:
a membrane, filter, and/or adsorption unit located between the fourth port and the external atmosphere.

\* \* \* \* \*